Sept. 1, 1925.
C. A. TUTTLE
1,552,097
COLLAPSIBLE AUTO RIM
Filed March 7, 1923
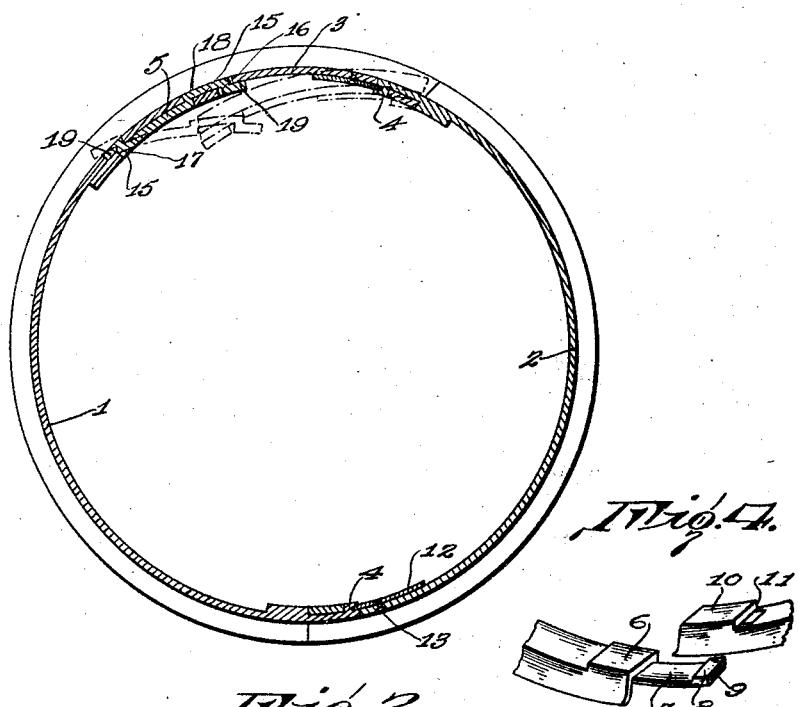
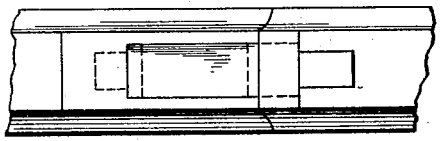
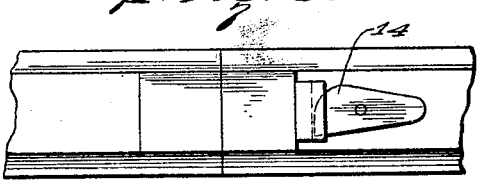
Inventor
Charles A. Tuttle.

Patented Sept. 1, 1925.

1,552,097

UNITED STATES PATENT OFFICE.

CHARLES A. TUTTLE, OF BUCYRUS, OHIO.

COLLAPSIBLE AUTO RIM.

Application filed March 7, 1923. Serial No. 623,424.

*To all whom it may concern:*

Be it known that I, CHARLES A. TUTTLE, a citizen of the United States, residing at Bucyrus, in the county of Crawford and State of Ohio, have invented certain new and useful Improvements in a Collapsible Auto Rim, of which the following is a specification.

This invention relates to an improved demountable automobile wheel rim for motor vehicles, and has for its primary object to provide a construction whereby the rim may be collapsed so that a tire may be easily placed upon or removed from the rim.

As is well understood in the art, a pneumatic tire carried by the rim must be sometimes put on and removed from the rim itself, and the object of this invention is to provide a collapsible rim of very simple construction, which can be easily and cheaply made, which can be easily and conveniently applied to and removed from the tire and which is not liable to get out of order when in use.

A still further object of my invention is to provide a demountable rim of the above indicated character, which can be readily moved to an active or inactive position, without the employment of any special tools.

And a still further object of the invention is to provide a demountable rim, which is simple in construction, durable, efficient for the purpose intended, and one that can be manufactured and placed on sale at a relatively low cost.

The invention consists of a collapsible rim capable of carrying out the foregoing objects, and more particularly one having one or more of the many features and details of construction as will be hereinafter more fully set forth in the specification and claim.

Referring to the accompanying drawing which forms a part of this specification and which clearly illustrates the construction and operation of my improved demountable rim, Figure 1 is a side view partially in section, illustrating my invention in its preferred form.

Figure 2 is a bottom plan view of the collapsible mechanism of the rim.

Figure 3 is a plan view of the locking mechanism for one of the hinged sections, showing its appearance from the inside of the rim, and Figure 4 is a perspective view of the parts shown in Figure 3, separated one from the other.

Referring to the accompanying drawing in detail, like characters will be used to designate like parts in the different views.

In the drawing, it will be noted that my improved rim is of the channel type and includes a split resilient body formed of swinging and removable connected members 1, 2, and 3. The sections 1 and 2, and 2 and 3 are secured in an active position by a novel form of locking mechanism indicated as a whole by the numeral 4, while the sections 1 and 3 are connected by a removable link member 5.

The novel form of fastening means indicated as a whole by the numeral 4 comprises a shoulder 6 formed on the inner side of the rim adjacent one end of each of the sections 1 and 2. An extension 7 which is on an arcuate line with the inner surface of the rim extends outwardly from the shoulder 6 and is provided with an enlarged head 8 having a recess 9 in the extreme end of same. The opposite end of the section 2 and the section 3 is formed with an enlargement or shoulder 10 having an aperture 11 directly in the rear of same.

When pressing the sections 1 and 2 and 2 and 3 together, the shoulder or enlargement 10 is placed over the extension 7 so that the shoulder or enlargement 8 on the end of the extension is permitted to extend through the aperture 11. A locking pawl 12 is connected as at 13 to the underside of sections 2 and 3 and when the locking pawl is moved into an operative position, the cam end 14 of same enters the opening 9 in the end of the head or enlargement 8.

The meeting ends of the rim sections which are fastened by means of the link 5 are each provided with a lip or extension 15. The lip 15 of the section 3 extends beyond the end of same and has an aperture 16 therein, while the lip 15 of the section 1 is secured to the underside of said section at a point adjacent the end of same, and an aperture 17 is formed in the section 1 at a point adjacent the front edge of the lip 15. The link 5 has a U-shaped portion 18 formed therein. Each end of the link is formed L-shaped as at 19, said L-shaped ends adapted to pass through the apertures 16 and 17 in the sections 1 and 3.

When it is desired to replace or remove a tire from the rim, pressure is exerted on the section 3 at the point of engagement with the section 1, thus moving the said sections. The pawls 12 are then moved so that the cam ends 14 of same are brought out of engagement with the openings 9 in the enlargements 8, to permit the rim sections to be easily separated.

In view of the foregoing description of my invention taken in connection with the accompanying drawing, it is thought that any further explanation as to the construction, operation, and objects of this invention is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

A wheel rim structure comprising rim sections having at one end surfaces adapted to abut against each other and means for locking the sections together at their abutting surfaces, the opposite end surfaces of the rim sections being beveled and spaced from each other, a link member passing through one of the rim sections in the vicinity of its beveled end and provided at one end with an offset lip and at a point between its ends with a U-shaped portion, a relatively short rim section adapted to fit in the space between the bevelled ends of the first mentioned rim sections and having bevelled surfaces adapted to abut against the bevelled surfaces of the first mentioned rim sections, the said relatively short rim section being provided at a point between its ends with an opening adapted to receive the U-shaped portion of the link, one of the first mentioned rim sections having an opening adapted to receive the link and means for locking one end of the relatively short rim section with one of the first mentioned rim sections.

In testimony whereof, I have affixed my signature.

CHARLES A. TUTTLE.